US 7,717,356 B2

(12) United States Patent
Petersen

(10) Patent No.: US 7,717,356 B2
(45) Date of Patent: May 18, 2010

(54) AERIAL APPLICATION DISPERSAL SYSTEM

(76) Inventor: Scott Petersen, 15801 E. 2000 North Rd., Pontiac, IL (US) 61764

( * ) Notice: Subject to any disclaimer, the term of this patent is extended or adjusted under 35 U.S.C. 154(b) by 279 days.

(21) Appl. No.: 11/810,842

(22) Filed: Jun. 7, 2007

(65) Prior Publication Data
US 2008/0302884 A1 Dec. 11, 2008

(51) Int. Cl.
*A62C 5/02* (2006.01)
(52) U.S. Cl. .................. 239/8; 239/171; 239/172; 239/654; 244/136
(58) Field of Classification Search ............ 239/8, 239/171; 244/136
See application file for complete search history.

(56) References Cited

U.S. PATENT DOCUMENTS

| | | | |
|---|---|---|---|
| 4,453,675 A | | 6/1984 | Kodadek et al. |
| 4,892,255 A | * | 1/1990 | Waldrum ............... 239/682 |
| 4,979,571 A | * | 12/1990 | MacDonald ............ 169/44 |
| 5,148,989 A | * | 9/1992 | Skinner ................ 239/171 |
| 5,794,847 A | * | 8/1998 | Stocker ................. 239/8 |
| 6,708,080 B2 | | 3/2004 | Benneweis |
| 6,711,501 B2 | | 3/2004 | McClure et al. |
| 6,877,675 B2 | | 4/2005 | Benneweis |

* cited by examiner

*Primary Examiner*—Dinh Q Nguyen
(74) *Attorney, Agent, or Firm*—Knechtel, Demeur & Samlan

(57) ABSTRACT

An aerial application dispersal system that comprises an aerial vehicle and an aerial dispersal unit. The aerial dispersal unit provides an insect control substance, a flake auger, and a motor to drive the flake auger for transporting the insect control substance to a dispensing chamber. The aerial dispersal unit also provides a glue substance, a pump, and a motor to drive the pump for transporting the glue substance from a storage container to the dispensing chamber for mixing with the insect control substance. The dispensing chamber is provided with a motor for forcing the insect control substance mixed with the glue substance out an exit portal for disbursement over the designated area. A control box, control switches, global positioning satellite system, and dispersal unit operator interface are also provided for automatically regulating the mixing and dispensing rate of the insect control substance and glue substance in relation to the ground speed of the aerial vehicle for maintaining a constant, uniform disbursement of a bonded substance over a designated area.

20 Claims, 10 Drawing Sheets

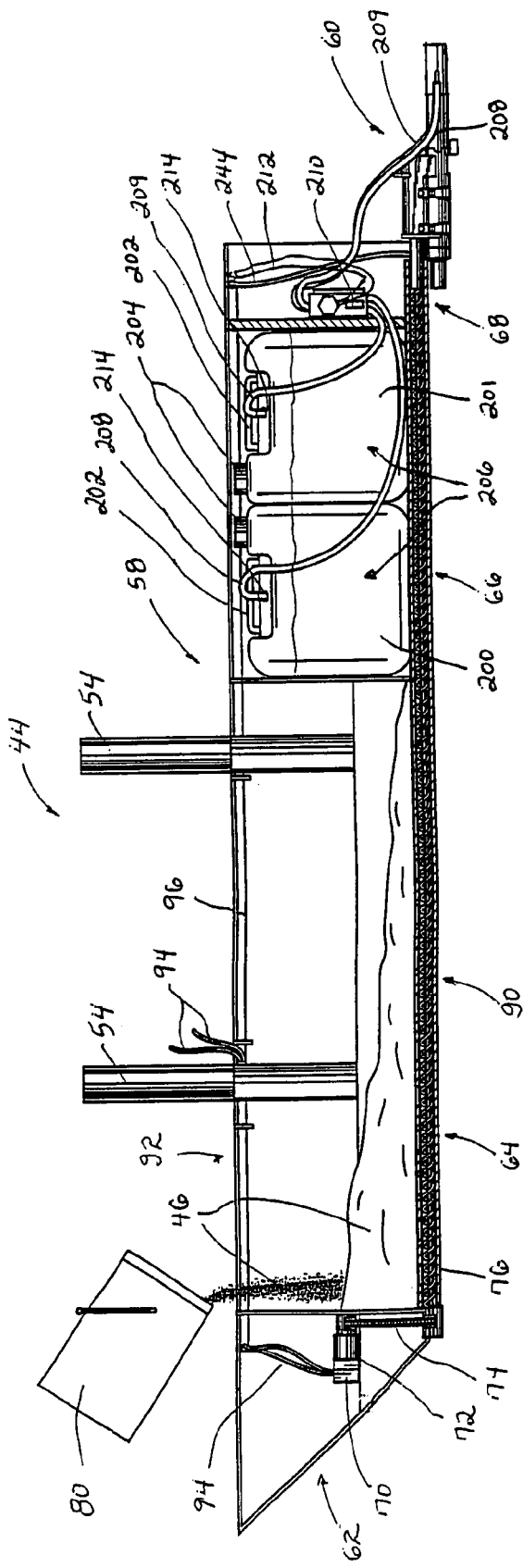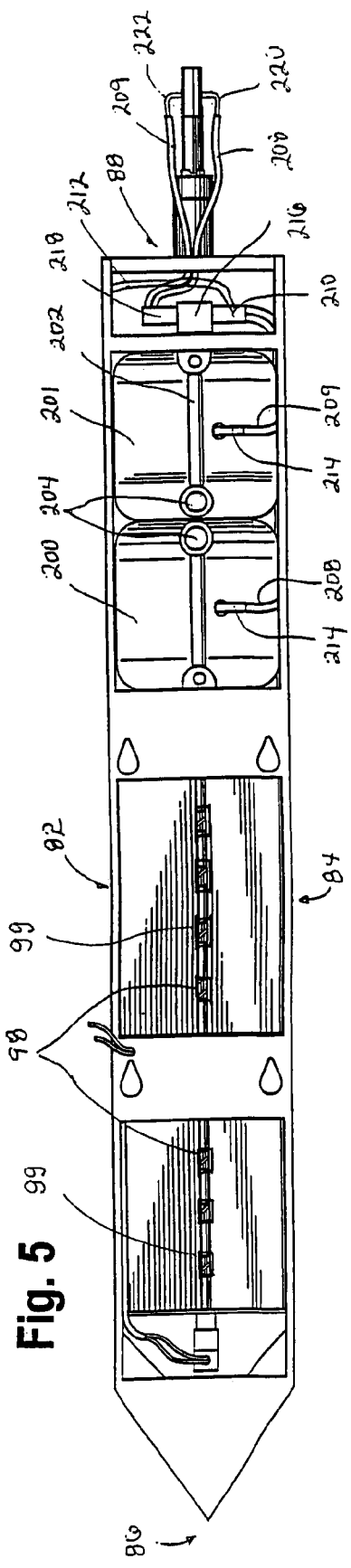

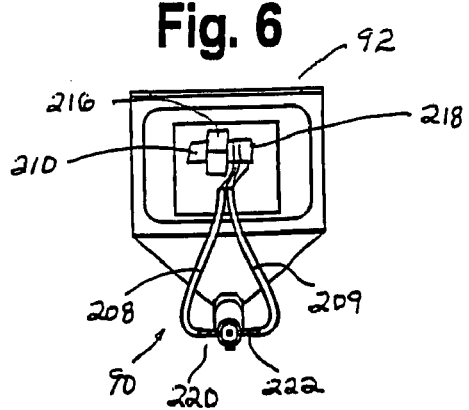
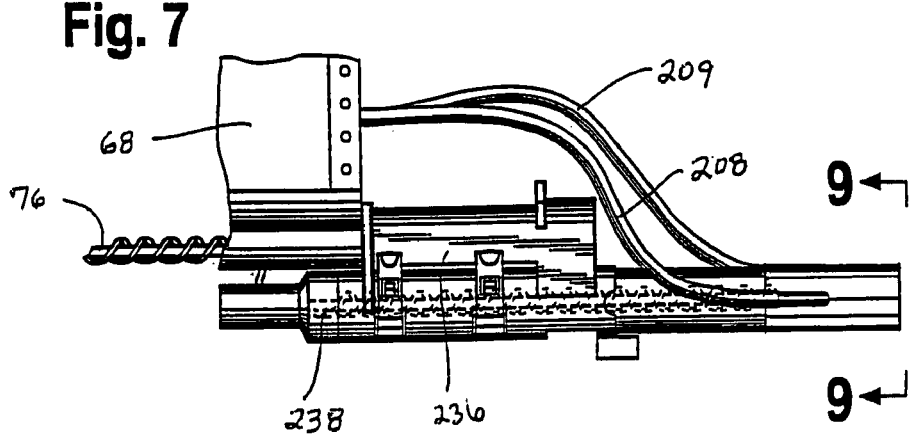
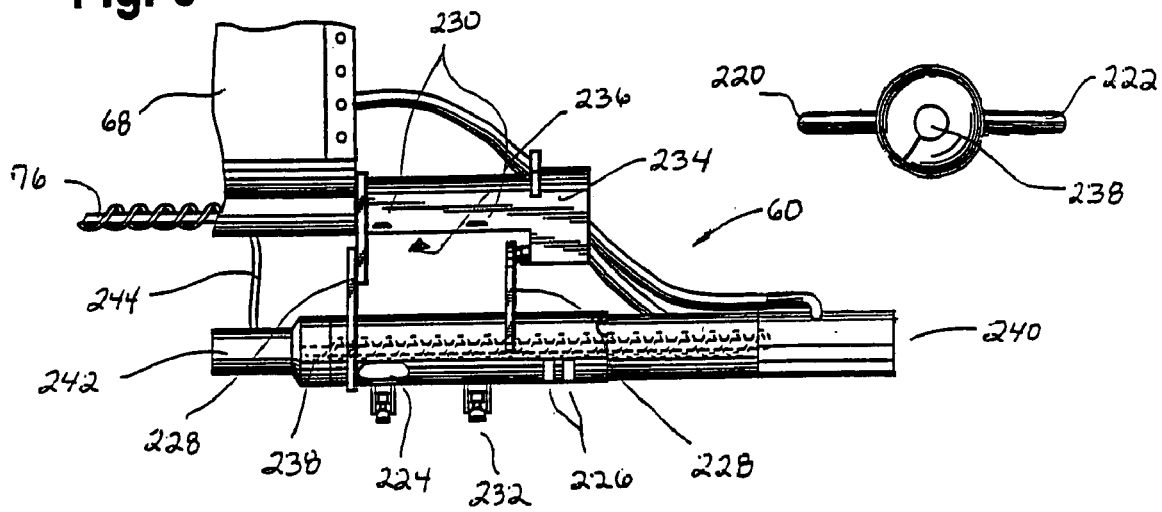

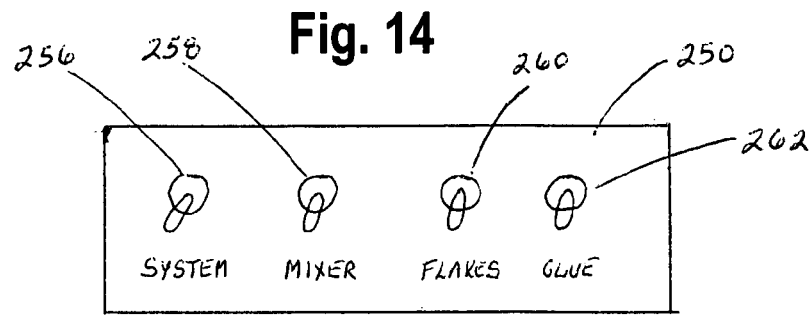
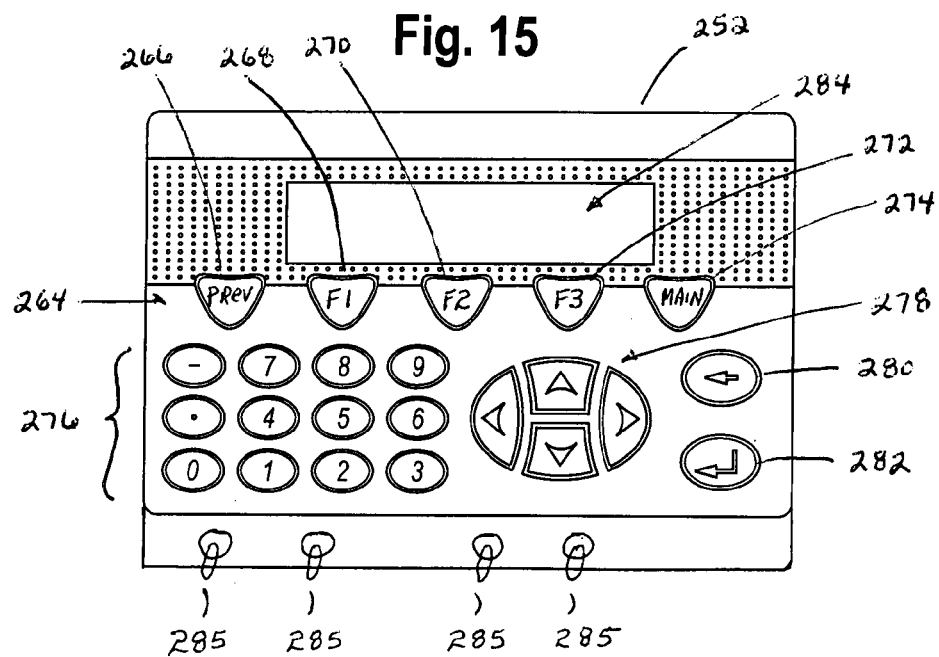
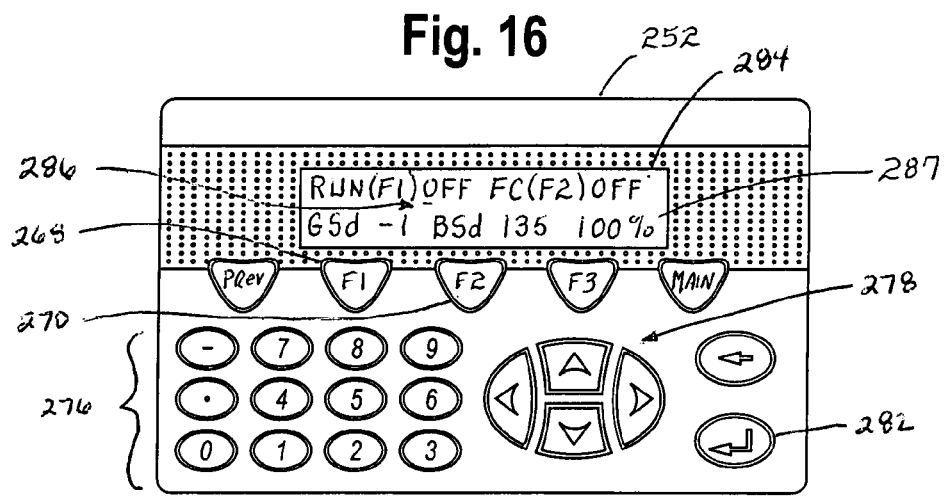

AERIAL APPLICATION DISPERSAL SYSTEM

I. FIELD OF THE INVENTION

The present invention relates to an aerial application dispersal system attached to an aerial vehicle such as an aircraft for dispensing an insect control substance. More specifically, the aerial application dispersal system continually monitors and regulates the dispensing rate of the insect control substance in relation to the ground speed of the aerial vehicle for maintaining a constant, uniform disbursement of the insect control substance during application.

II. DESCRIPTION OF THE PRIOR ART

The application of insect control substances to crops, fields, or other areas is proving a successful means to protect designated areas against insect damage. In a typical application, flakes imbedded with a chemical substance such as pheromone are disbursed from the aerial dispersal system over the designated area to be protected during the insect mating season. Upon application to the designated area, the pheromones are naturally released from the flakes to confuse the adult male insects and thereby inhibit them from locating and mating with eligible female insects throughout the designated area. By disrupting the mating of these insects, this safely and effectively reduces the population of insects available to damage the designated area.

The use of aerial spraying or dispensing units to disburse such insect control substances over designated areas is known in the art. For example, U.S. Pat. No. 4,453,675 entitled "Aerial Spraying Apparatus" discloses an aerial dispensing apparatus that is detachably mounted under each wing of an aircraft for adhesively coating and dispensing flakes containing an insect control substance. The apparatus includes an aerodynamically styled liquid adhesive supply chamber secured to the forward end of a detachable support frame and a flake storage container movably supported on the rear portion of the frame for movement rearwardly of the trailing edge of the wing to facilitate filling of the container. The container is provided with a bottom opening which communicates with an electrically driven auger for metering a supply of flakes to a mixing chamber. An electrically driven pump supplies a metered amount of liquid adhesive to the mixing chamber. A propeller driven mixing blade is rotatably mounted in the mixing chamber to facilitate the coating of the individual flakes with adhesive and for impelling the flakes rearwardly through the open end of the mixing chamber. A spinner is rotatably mounted adjacent the open end of the mixing chamber to aid in dispersing the adhesively coated flakes.

As disclosed, the device dispenses flakes, coated with an adhesive, at a constant or pre-calibrated, fixed rate from an aircraft. The inherent problem with this system is that the system does not account for wind turbulence or other forces that may affect the aircraft during application. When these forces are in affect, it alters the speed of the aircraft relative to the ground. For example, these forces may increase the headwind or drag on the aircraft which would reduce the speed of the aircraft relative to the ground. Or, these forces may increase the tailwind on the aircraft which would increase the speed of the aircraft relative to the ground. In either instance, as the speed of the aircraft changes, this then changes the amount of insect control substance that should be disbursed from the aerial dispensing apparatus to the designated area. In the '675 patent, if the aircraft is going slower than anticipated, the aerial dispensing apparatus will continue to dispense the insect control substance over the designated area at the same, pre-calibrated, fixed rate. This will cause an excess amount of the insect control substance to be dispensed over the designated area. Likewise, if the aircraft is going faster than anticipated, this will cause a deficient amount of the insect control substance to be dispensed over the designated area.

As a result, by not taking into account the forces acting on the aircraft, the rippling effect is that the aerial dispensing apparatus is: (a) not able to provide a uniform disbursement or application of the insect control substance over the designated area, (b) can cause over treating of portions of the designated area with the insect control substance, (c) if over treated, the aerial dispensing apparatus may assist in damaging the designated area and/or depleting the budgeted insect control substance carried by the aircraft causing the additional time and expense of having to land, refill the containers with more insect control substance than anticipated, and then complete the spraying, (d) can cause under treating portions of the designated area with not enough of the insect control substance, and (e) if under treated, the aerial dispensing apparatus may possibly not disburse enough insect control substance over the designated area to adequately protect the area against damage from the insects.

Applicant's inventive aerial application dispersal system, on the other hand, solves these problems. Thus, there is a need and there has never been disclosed Applicant's new inventive aerial application dispersal system.

III. SUMMARY OF THE INVENTION

The present invention is an aerial application dispersal system that comprises an aerial vehicle and an aerial dispersal unit. The aerial dispersal unit provides an insect control substance, a flake auger, and a motor to drive the flake auger for transporting the insect control substance to a dispensing chamber. The aerial dispersal unit also provides a glue substance, a pump, and a motor to drive the pump for transporting the glue substance from a storage container to the dispensing chamber for mixing with the insect control substance. The dispensing chamber is provided with a motor for forcing the insect control substance mixed with the glue substance out an exit portal for disbursement over the designated area. A control box, control switches, global positioning satellite system, and dispersal unit operator interface are also provided for automatically regulating the mixing and dispensing rate of the insect control substance and glue substance in relation to the ground speed of the aerial vehicle for maintaining a constant, uniform disbursement of a bonded substance over a designated area.

IV. BRIEF DESCRIPTION OF THE DRAWINGS

The Description of the Preferred Embodiment will be better understood with reference to the following figures:

FIG. 4 is a side perspective view, with portions removed, illustrating the aerial dispersal unit.

FIG. 5 is a top perspective view of the aerial dispersal unit.

FIG. 6 is an end perspective view of the aerial dispersal unit and, in particular, illustrating the system for transporting the glue substance from the containers to the dispensing chamber.

FIG. 7 is a side perspective view of the dispensing chamber in the locked position.

FIG. 8 is a side perspective view of the dispensing chamber in the unlocked or open position.

FIG. 9 is an end view of the dispensing chamber and, in particular, illustrating the inlet ports and the flake auger contained therein.

FIG. 14 is a front view of the control switches used in the operation of the components in the aerial vehicle and aerial dispersal units.

FIG. 15 is a front view of the dispersal unit operator interface.

FIG. 16 is a front view of the dispersal unit operator interface and, in particular, illustrating the information displayed in the display at initialization relating to various functions and speeds for the system.

V. DETAILED DESCRIPTION OF THE PREFERRED EMBODIMENT

Figure 1:
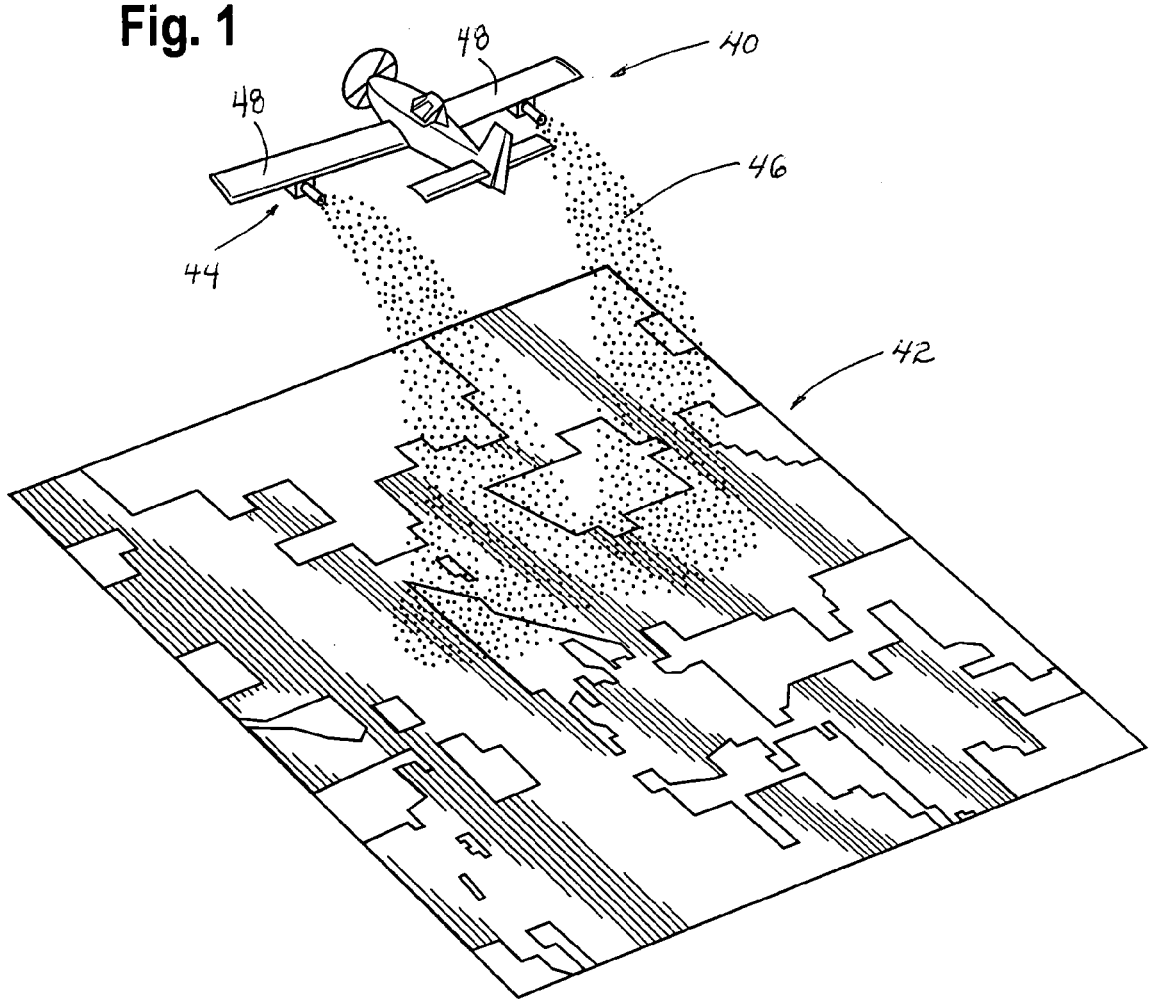
FIG. 1 is a perspective view of an aerial vehicle using Applicant's invention for dispensing an insect control substance over a designated area.

Turning first to FIG. 1, there is illustrated an aerial vehicle 40 flying over a crop, field, or other designated area (i.e., designated area 42). In a non-limiting example, the aerial vehicle 40 is shown as a single engine, fixed wing aircraft. Alternatively, the aerial vehicle may be any other type of manned or unmanned aerial vehicle provided that it is used in the manner or accomplishes the invention as described herein.

Situated underneath each airfoil 48 of the aerial vehicle 40 are substantially identical aerial dispersal units 44. From each aerial dispersal unit 44, an insect control substance 46 is dispensed into the air for displacement over the designated area 42. In the preferred embodiment, the insect control substance 46 (also sometimes referred to herein as "flakes") is a gypsy moth mating disruptant substance that is manufactured and sold under the name Hercon® Disrupt® II. This gypsy mating disruptant substance is a synthetic insect pheromone flake (i.e., sized $1/32" \times 3/32"$) that slowly emits or releases a pheromone to cover up the natural pheromone trails produced by female gypsy moths. This released pheromone acts to disrupt or interfere with the normal communication between the male and female moths for reducing the mating of gypsy moths over the designated area 42. Alternatively, any other insect control substance 46 known to one skilled in the art for any type of insect may be used provided that the insect control substance 46 is a dry form substance.

Figure 2:
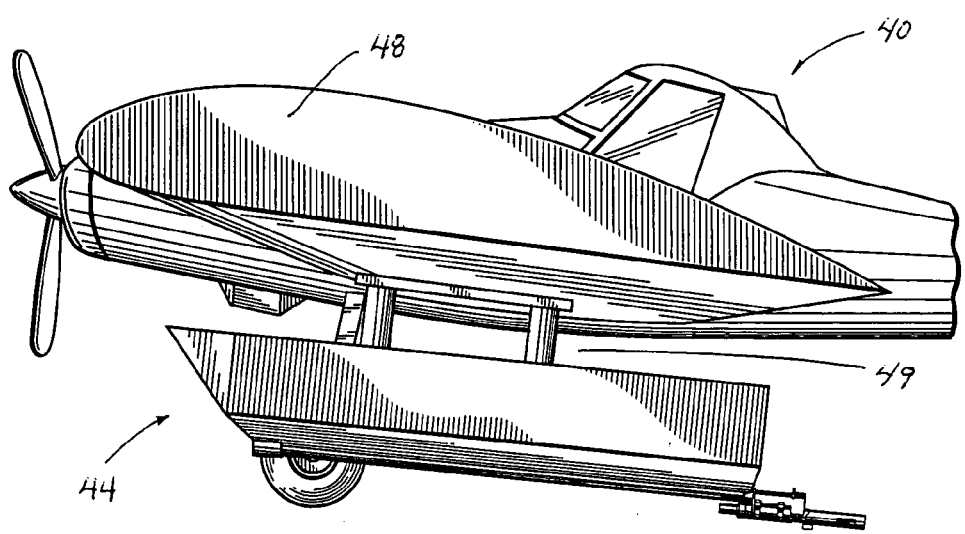
FIG. 2 is side perspective view of the aerial vehicle and, in particular, illustrating the attachment of the aerial dispersal unit to the aerial vehicle.
Figure 3:
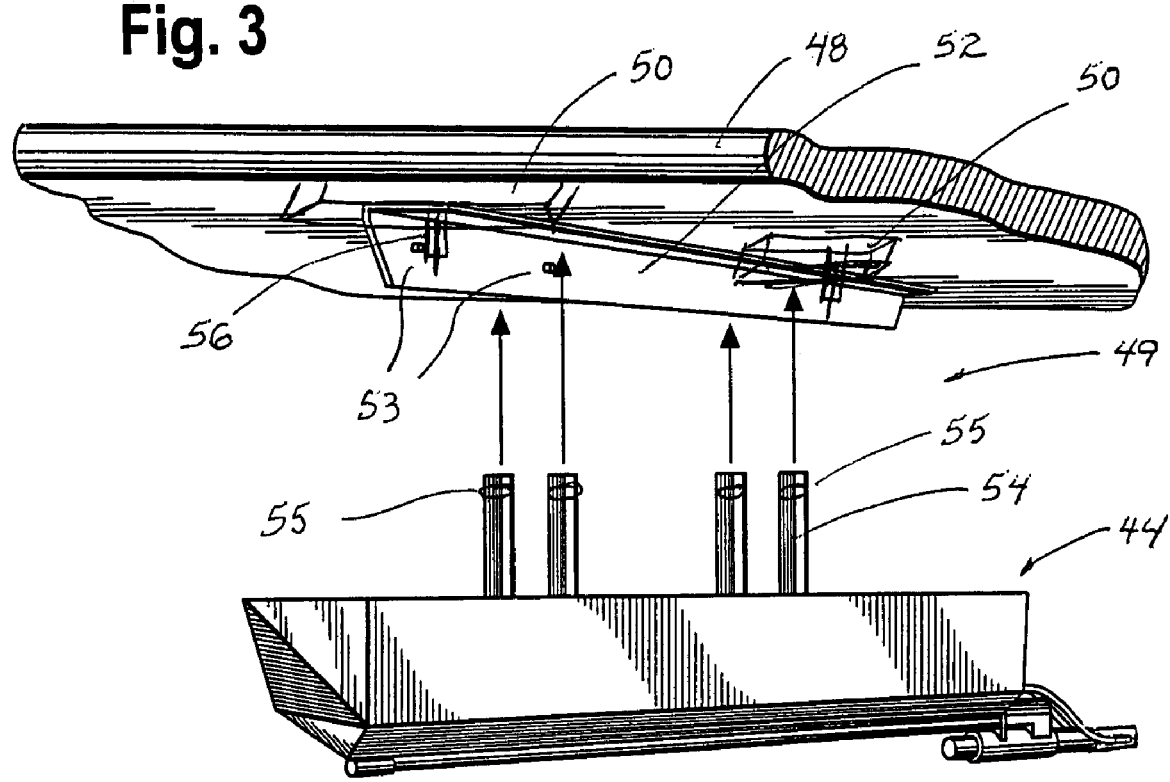
FIG. 3 is a perspective view, with portions removed, illustrating the aerial dispersal unit as detached from the aerial vehicle.

Referring to FIG. 2, the attachment of each aerial dispersal units 44 to the airfoil 48 of the aerial vehicle 40 is accomplished by a mounting means 49. The mounting means 49 is more clearly illustrated in FIG. 3. In the preferred embodiment, the mounting means 49 comprises mounting blocks 50, a mounting rail 52, and support columns 54.

The mounting blocks 50 are fixedly secured to the underside of the airfoil 48. Preferably, the mounting blocks 50 are made of aluminum and mounted using bolts or any other means known to one skilled in the art. The mounting rail 52 is fixedly secured perpendicular to each mounting block 50 for forming a "T" shape at each end of the mounting rail 52. In the preferred embodiment, the mounting rail 52 is secured to the mounting block 50 using rivets 56. The mounting rail 52 is also provided with holes 53 and each support column 54 is provided with a corresponding hole 55. Upon aligning the holes 53 in the mounting rail 52 with the holes 55 in the support column 54, the support column 54 can be secured to the mounting rail 52 using bolts. Alternatively, any other means known to one skilled in the art may be used to secure each support column 54 to the mounting rail 52.

Referring to FIGS. 4-6, the aerial dispersal unit 44 is more clearly illustrated. The aerial dispersal unit 44 comprises a hopper 58 and a dispensing chamber 60. The hopper 58 is elongated having a top half being substantially rectangular shape and having a bottom half being substantially triangular in shape. The hopper 58 comprises opposed sides 82 and 84 (See FIG. 5), a proximal end 86 and a distal end 88 (See FIG. 5), and a top 92 and a bottom 90 (See FIG. 6). The hopper 58 is also separated into a forward section 62, a forward middle section 64, an aft middle section 66, and an aft section 68 (See FIG. 4).

In the preferred embodiment, the forward section 62 contains a motor 70. The motor 70 is preferably a NEMA 34 variable speed, stepper motor. Alternatively, the motor 70 may be another other type of motor provided that it has sufficient power to drive the flake auger 76 as described in further detail below and accomplishes the purpose described herein. This motor 70 may also be referred to herein as the "flake motor." Electrical wires 94 from the aerial vehicle 40 are routed into and through a conduit 96 in the hopper 58 to feed electricity to the motor 70. A mounting bracket 72 is used to secure the motor 70 within the forward section 62. Alternatively, any means known to one skilled in the art for securing the motor 70 to the forward section 62 may be used.

A drive chain 74 extends from the motor 70 for rotatable communication with a flake auger 76. The flake auger 76 extends along the bottom 90 of the hopper 58 adjacent to and under the forward middle section 64, aft middle section 66, and aft section 68 for providing rotatable communication of the insect control substance 46 with the dispensing chamber 60.

The forward middle section 64 of the hopper 58 provides the receptacle for receiving the insect control substance 46. The insect control substance 46 is preferably poured from a bucket 80 or other means over the top 92 of the hopper 58 and into the forward middle section 64. In the preferred embodiment, the forward middle section 64 can be partially-filled or completely filled with the insect control substance 46 depending upon the amount of insect control substance 46 required for a designated area 42. As the bottom half of the hopper 58 is triangular in shape, the insect control substance 46 received into the forward middle section 64 is funneled toward the bottom 90 of the hopper 58.

The forward middle section 64 is provided with a plurality of feeder ports 98 located above and adjacent to the flake auger 76 (See FIG. 5). The insect control substance 46 funneled through the forward middle section 64 is directed towards the plurality of feeder ports 98. The plurality of feeder ports 98 are used to facilitate the loading of the insect control substance 46 into the flake auger 76. In the preferred embodiment, the feeder ports 98 are substantially identical to one another and spaced equidistant from one another along the entire bottom of the forward middle section 64 thereby enabling an equal distribution of the insect control substance 46 to be received into the flake auger 76 across the bottom of the middle section 64.

Also, each of these feeder ports 98 are preferably provided with a cover 99. The main purpose of the cover 99 is to prevent the entire weight of the insect control substance 46 within the forward middle section 64 from pressing downwardly on top of the feeder ports 98 and directly upon the flake auger 76 and, thereby, possibly causing the insect control substance 46 to be compressed within the flake auger 76 and preventing the flake auger 76 from moving freely. As a result, with this cover 99 in place, the cover 99 bears this weight instead and the insect control substance 46 is funneled around the cover 99 and into the feeder ports 98.

The aft middle section 66 is provided with a pair of containers 200 and 201. The containers 200 and 201 preferably rest adjacent to one another and are of a combined size sufficient to be frictionally secured within the aft middle section 66. Alternatively, the containers 200 and 201 may be secured within the middle section 66 by any means known to one skilled in the art. By securing the containers 200 and 201 within the aft middle section 66, this restriction prevents the containers 200 and 201 from being damaged while in flight due to any turbulence experienced by the aerial vehicle 40.

Each container 200 and 201 is provided with a handle 202 for assisting in the insertion and removal of the containers 200 and 201 from the aft middle section 66 of the hopper 58. A releasable cap 204 is provided for enabling the containers 200 and 201 to be opened and filled with a glue substance 206 and/or closed for securing the glue substance 206 within the containers 200 and 201. In the preferred embodiment, the glue substance 206 is a GELVA 2333 manufactured by Cytec Surface Specialties, Inc., located in Smyrna, Ga. Alternatively, the glue substance 206 may be any other type of adhesive, bonding, or other type of substance known to one skilled in the art provided that it can be used to accomplish the invention as described herein. In the preferred embodiment, container 200 can accommodate a substantially identical volume of glue substance 206 as container 201. As used herein, containers 200 and 201 can be filled to a capacity of at least eleven (11) gallons of the glue substance 206. Alternatively, containers 200 and 201 may be designed to accommodate more or less glue substance 206, as desired.

An outlet port 214 is disposed in each container 200 and 201 adjacent to the handle 202 and releasable cap 204. In the preferred embodiment, the handle 202, releasable cap 204, and outlet port 214 are positioned at the top side of the containers 200 and 201 such that they remain easily accessible when the containers 200 and 201 are secured within the aft middle section 66 of the hopper 58.

A pair of elongated flexible tubes 208 and 209 are affixed to and extend outwardly from each outlet port 214. Each elongated flexible tube 208 and 209 is affixed to each outlet port 214 by any type of clamp. Alternatively, each elongated flexible tube 208 and 209 may be affixed to each outlet port 214 by any other means known to one skilled in the art provided that each elongated flexible tube 208 and 209 remains in fluid communication with their respective outlet ports 214.

A pump 218 (See FIG. 5) is provided and fixedly secured in the aft section 68 of the hopper 58 by a mounting bracket 216. The purpose of the pump 218 is to facilitate the transportation of the glue substance 206 from the containers 200 and 201, through the elongated flexible tubes 208 and 209, and into the dispensing chamber 60.

In the preferred embodiment, the pump 218 is preferably a peristaltic pump such that the pump 218 contains a rotating rotor that separately compresses each elongated flexible tube 208 and 209 as the rotor rotates or turns (i.e., thereby squeezing each of the flexible tubes 208 and 209 during rotation). As this occurs, the rotor forces the glue contained within each elongated flexible tube 208 and 209 to move through the elongated flexible tube 208 and 209 thereby facilitating the transportation of the glue substance 206 from each of the containers 200 and 201 to the dispensing chamber 60. In the preferred embodiment, the elongated flexible tube 208 feeds the glue substance 206 from the container 200 to an inlet port 220 located on the dispensing chamber 60 and the other elongated flexible tube 209 feeds the glue substance 206 from the other container 200 to an inlet port 222 located on the opposite side of the dispensing chamber 60 from inlet port 220. Alternatively, the pump 218 may be any other or type of pump known to one skilled in the art provided that it accomplishes the purpose described herein.

A motor 210 is used to energize the pump 218. The motor 210 is preferably a NEMA 23 variable speed, stepper motor. Alternatively, the motor 210 may be another other type of motor provided that it sufficiently energizes the pump 218 and accomplishes the purpose described herein. This motor 210 may also be referred to herein as the "glue motor." Electrical wires 212 from the aerial vehicle 40 are routed into and through a conduit 96 in the hopper 58 to feed electricity to the motor 210. The motor 210 is likewise secured to the same mounting bracket 216 as the pump 218. Alternatively, any other means known to one skilled in the art for securing the motor 210 to the aft section 68 of the hopper 58 may be used.

The dispensing chamber 60 is where the glue substance 206 is mixed or adhesively bonded with the insect control substance 46. As is more clearly illustrated in FIG. 8, the dispensing chamber 60 is secured to the hopper 58 using a securing means. In the preferred embodiment, the securing means comprises the following. The hopper 58 provides a covering 234 which is affixed with a pair of latches 230. The dispensing chamber 60 is provided with a pair of snap hooks or locking clasps 232 for releasably locking with the latches 230 on the covering 234. A pair of pivoting arms 228 are fixedly secured to the both the dispensing chamber 60 and the covering 234 for enabling the dispensing chamber 60 to be lowered away and from or upwardly and toward the covering means 234 when desired.

In the preferred embodiment, when the covering 234 and the dispensing chamber 60 are locked to one another, as illustrated in FIG. 7, a hollow chamber 236 is created between them. This hollow chamber 236 is to be filled by the insect control substance 46 that is transported by the flake auger 76 from the forward middle section 64. When the insect control substance 46 enters the hollow chamber 236, the insect control substance 46 is then feed through the feeder ports 224 and 226 (See FIG. 8) into the dispensing chamber 60.

Located within the dispensing chamber 60 is another mixing auger 238 (See also FIG. 9). The purpose of this mixing auger 238 is to transport the insect control substance received from the feeder ports 224 and 226, through the dispensing chamber 60, and then out the exit portal 240 of the dispensing chamber 60. For efficiency and to accommodate the circular rotation of this mixing auger 238, the dispensing chamber 60 is preferably also made of a circular shape.

A motor 242 is used to rotate the mixing auger 238. The motor 242 is preferably a single speed, 24 volt, gear motor. Alternatively, the motor 242 may be another other type of motor provided that it sufficiently rotates the mixing auger 238 for transporting the insect control substance 46 through the dispensing chamber 60 and out the exit portal 240. This motor 242 may also be referred to herein as the "mixer motor." Electrical wires 244 from the aerial vehicle 40 are routed into and through a conduit 96 and into the aft section 68 of the hopper 58 to feed electricity to the motor 242.

As the insect control substance 46 is transported through the dispensing chamber 60, the glue substance 206 is received into the dispensing chamber 60 from inlet ports 220 and 222. As this occurs, the glue substance 206 becomes mixed or adhesively bonded with the insect control substance 46 prior to the insect control substance 46 exiting the exit portal 240 of the dispensing chamber 60. The bonding of the glue substance 206 to the insect control substance 46 assists in providing additional weight to the insect control substance 46 for it to reach the designated area 42 and, when the insect control substance 46 reaches the designated area 42, the glue substance 206 is used to adhesively bond the insect control substance 46 to the crop or field in the designated area 42. For reference herein, the term "mixture" is defined to include the glue substance 206 being mixed or bonded to the insect control substance 46 (i.e., to a flake).

Figure 10:
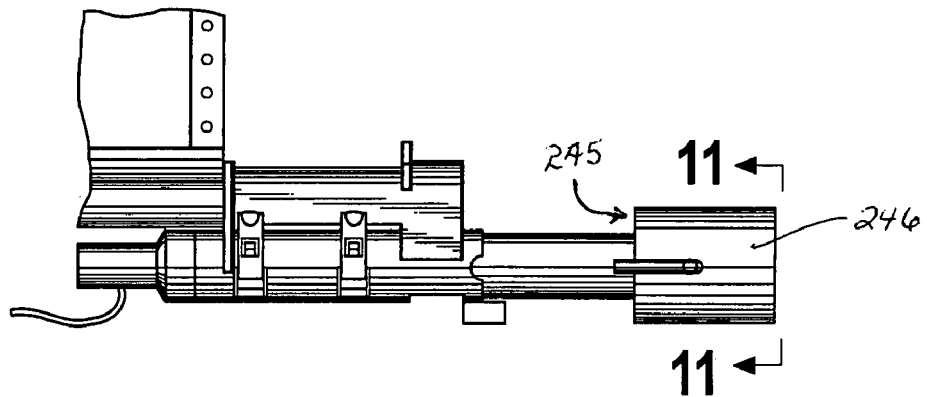
FIG. 10 is a side perspective view of an alternate embodiment of the dispensing chamber in the locked position and providing a outer chamber.
Figure 11:
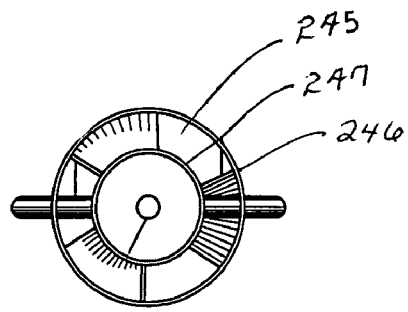
FIG. 11 is an end view of the alternate embodiment of the dispensing chamber and, in particular, illustrating the outer chamber.
Figure 12:
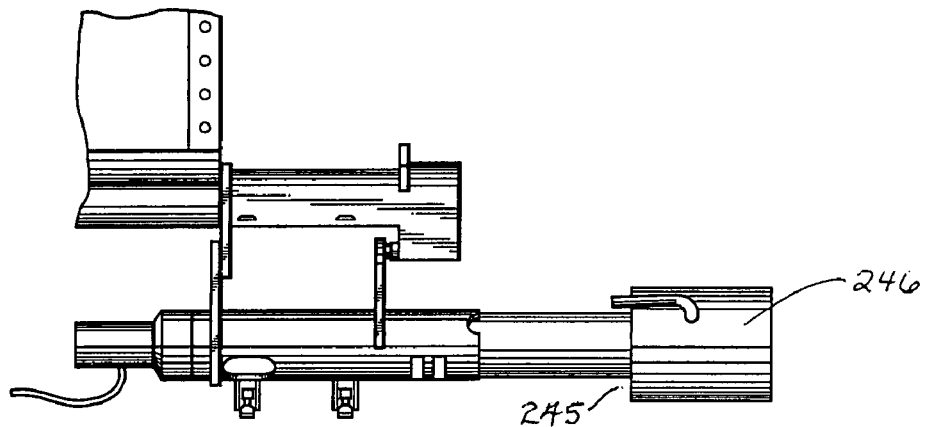
FIG. 12 is a side perspective view of the alternate embodiment of the dispensing chamber in the unlocked or open position and illustrating the outer chamber.

In an alternate embodiment as shown in FIGS. 10-12, the dispensing chamber 60 may be provided with a outer column 246. The main benefit of this outer column 246 is that a bypass gap 245 is created between the outer column 246 and the inner column 247. While flying, air will be forced through this bypass gap 245. When this occurs, this bypass air will engage the insect control substance 46 exiting the exit portal 240 and force the insect control substance 46 into a tighter or narrower disbursement trajectory from the dispensing chamber 60 causing the insect control substance 46 to displace into a tighter pattern or narrower swath over the designated area 42.

Figure 13:
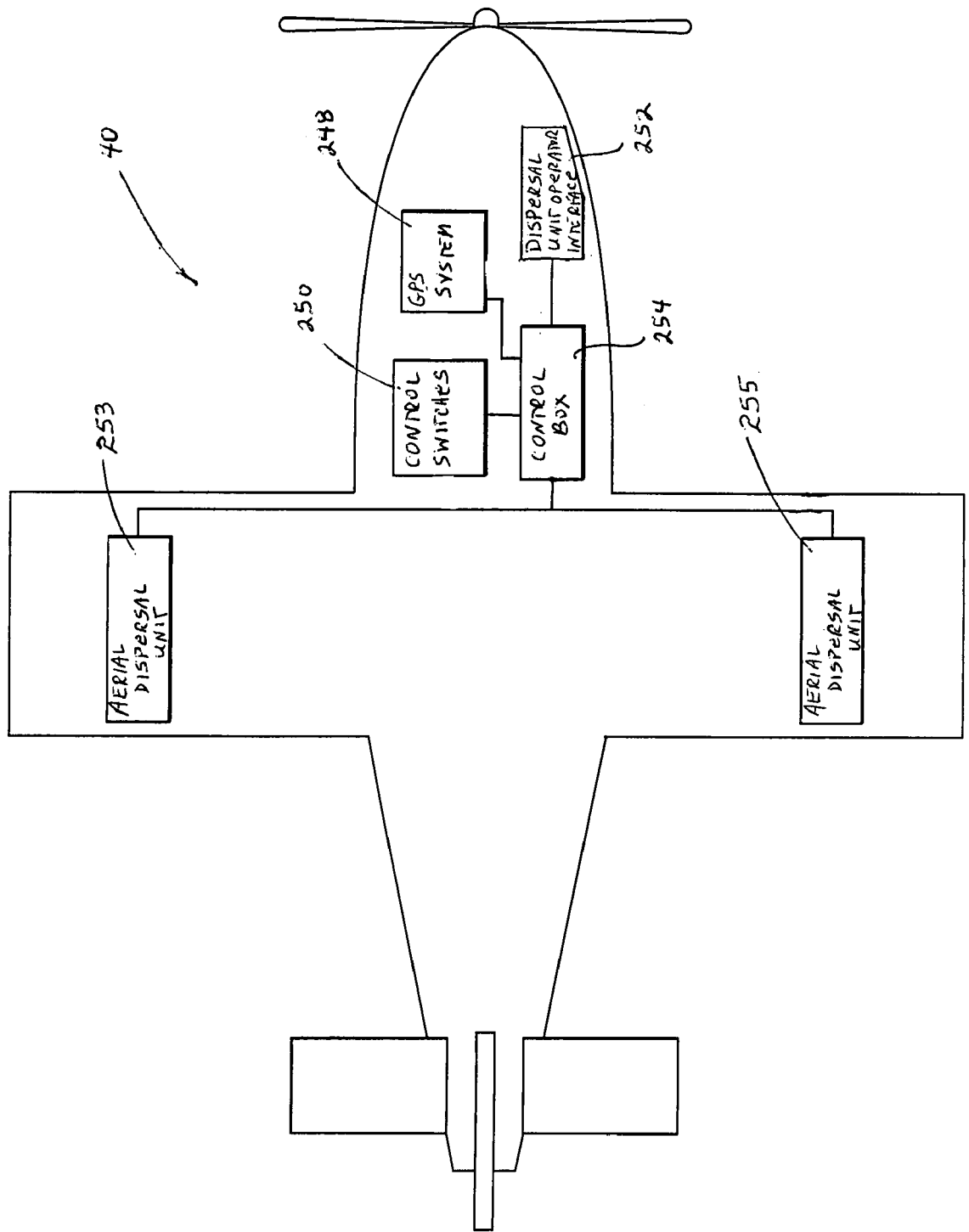
FIG. 13 is a flow schematic of the components used in the aerial vehicle to control the operation of the aerial dispersal units.

Referring to FIG. 13, the operation of the aerial dispersal unit 44 is further described. The aerial vehicle 40 is provided with a global positioning satellite (GPS) system 248, a set of control switches 250, a dispersal unit operator interface 252, and a control box 254. In the preferred embodiment, each of these components are located in the cockpit of the aerial vehicle 40 and within close proximity and/or reach of the pilot. Alternatively, should the aerial vehicle 40 be an unmanned vehicle, it is contemplated that, as is known to those skilled in the art, the use of these components in the aerial vehicle 40 can be controlled from a remote location.

In the preferred embodiment, the global positioning satellite (GPS) system 248 is SATLOC M-3 manufactured by Satloc, LLC located in Scottsville, Ariz. Alternatively, the global positioning satellite (GPS) system 248 can be any system that is known in the art.

The set of control switches 250 are more clearly illustrated in FIG. 14. The set of control switches 250 comprises a system switch 256, a mixer switch 258, a flakes switch 260, and a glue switch 262. In the preferred embodiment, the system switch 256 controls the power to the dispersal unit operator interface 252 and the controllers in the control box 254; the mixer switch 258 controls the power to the motor 242 (i.e., mixer motor) for operating the mixing auger 238 in the aerial dispersal unit 44; the flakes switch 260 controls the power to the motor 70 (i.e., flake motor) for operating the flake auger 76 in the aerial dispersal unit 44; and the glue switch 262 controls the power to the motor 210 (i.e., glue motor) for operating the pump 218 and the movement or transfer of the glue substance 206 in the aerial dispersal unit 44.

The dispersal unit operator interface 252 is more clearly illustrated in FIG. 15. The dispersal unit operator interface 252 provides function keys 264 which comprises the preview key 266, the function 1 (F1) key 268, the function 2 (F2) key 270, the function 3 (F3) key 272, and the main key 274; a numerical keypad 276; arrows 278 comprising of a left arrow, a right arrow, an up arrow, and a down arrow; a back key 280; a return key 282; and a display 284.

Situated at the bottom of the dispersal unit operator interface 252 are interrupt switches 285. These interrupt switches 285 are used to turn the power on and off to the flake motor in the left aerial dispersal unit 253 (i.e., left flake motor), the glue motor in the left aerial dispersal unit 253 (i.e., the left glue motor), the flake motor in the right aerial dispersal unit 255 (i.e., the right flake motor), and the glue motor in the right aerial dispersal unit 255 (i.e., the right glue motor). By using these interrupt switches 285, each of the flake motors and the glue motors can be calibrated. During this calibration, it is desired to calibrate each motor such that there is uniformity in speed between the flake motor and glue motor in each aerial dispersal unit such that the proper amount of insect control substance 46 is being mixed with the proper amount of glue substance 206. The calibration of these motors is collectively referred to as the "calibration rates."

To begin, the system switch 256 is depressed or toggled to the "on" position. When this occurs, electrical power is sent to energize the dispersal unit operator interface 252. As the dispersal unit operator interface 252 initializes, the display 284 will provide the information as illustrated in FIG. 16. The (F1) and (F2) displayed in the display 284 refer to the F1 key 268 and the F2 key 270, respectively. In the preferred embodiment, the F1 key 268 is used to arm the system and the F2 key 270 is used to turn on the flow control. In the preferred embodiment and as discussed in more detail below, when the flow control is turned on, the mixing and dispensing rate of the insect control substance and glue substance will automatically be regulated or adjusted in relation to the ground speed of the aerial vehicle for maintaining a constant, uniform disbursement of the insect control substance 46 over the designated area 42.

At the initialization stage, neither of these functions have been started and this is confirmed by the term "Off" adjacent the F1 and F2 in the display 284. The term "GSd" refers to the actual ground speed of the aerial vehicle 40 (in miles per hour) when flying. When the flow control is not turned on (i.e., FC(F2) OFF), the GSd reading will indicate a "−1" as shown. This type of reading confirms that the GPS system 248 is not receiving global positioning satellite information. When the flow control is turned on (i.e., FC(F2) ON), the GPS system 248 will be receiving global positioning satellite information data which the computer processor or controller 296, discussed in more detail below, uses to determine or convert to the actual ground speed of the aerial vehicle 40. If the aerial vehicle 40 is not in the air or flying, the GSd reading will indicate a "0." If the aerial vehicle 40 is in the air and flying, the GSd reading will display or indicate the actual ground speed of the aerial vehicle 40.

The term "BSd" refers to base speed. The base speed represents the initial ground speed that the aerial vehicle 40 is anticipated to fly at during an application. As depicted, the BSd shows a reading of "135." Accordingly, this base speed of 135 indicates that the initial ground speed of the aerial vehicle 40 should be 135 miles per hour (mph).

A variable dispensing rate number 287 is also depicted in the display 284. The variable dispensing rate number 287 represents the percentage (%) of the calibration rates discussed above. Continuing with the same example as depicted in FIG. 16, the variable dispensing rate number 287 is indicated to be 100%. This means that, at the base speed of 135 miles per hour (mph), the flake motors and the glue motors are operating at 100% of the calibration rates or at the exact calibration rates. Alternatively, the correlation between the base speed and the variable dispensing rate number 287 can be set as desired.

Depressing the arrow keys 278 enables a cursor 286 to toggle between each of these terms in the display 284. When the cursor 286 is on the GSd reading or the BSd reading, these numbers may be changed by entering a new number using the numerical keypad 276 and then depressing the return key 282 to save this change.

Figure 17:
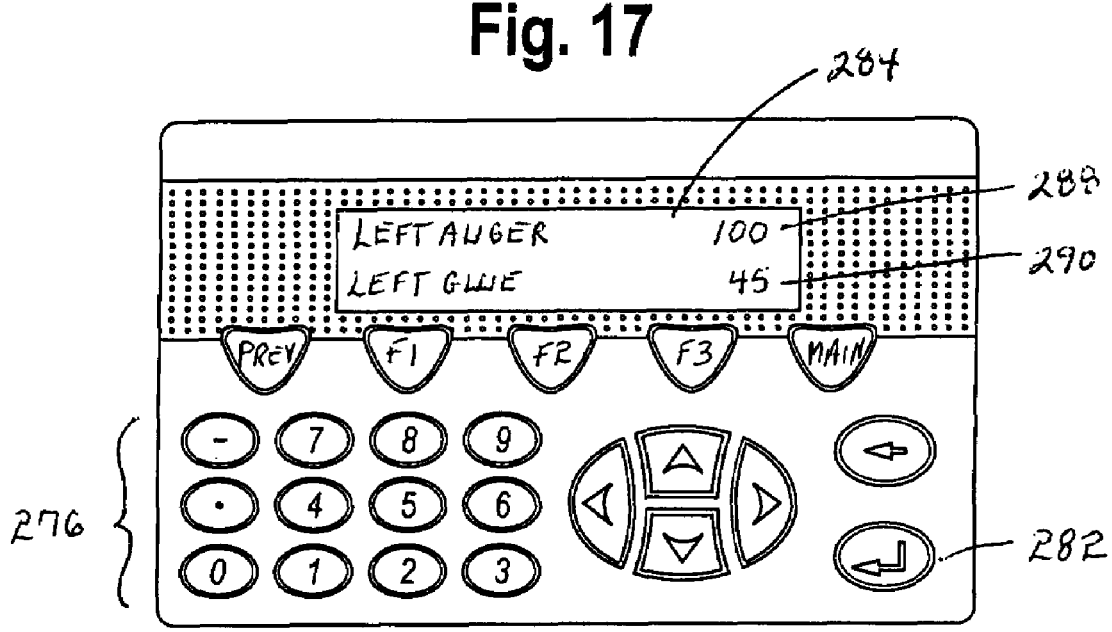
FIG. 17 is a front view of the dispersal unit operator interface and, in particular, illustrating the information displayed in the display at initialization relating to the left aerial dispersal unit.

At this same time, if the arrow 278 (down) is depressed, the display 284 will provide the information as illustrated in FIG. 17. This information displays the term "Left Auger" adjacent to a left auger motor speed 288 and a "Left Glue" adjacent to a left glue motor speed 290. The term "Left Auger" refers to the left flake motor and the left auger motor speed 288 refers to the speed that has been calibrated in the calibration rates for the left flake motor. The term "Left Glue" refers to the left glue motor and the left glue motor speed 290 refers to the speed that has been calibrated in the calibration rates for the left glue motor. These motor speeds indicated in the display 284 are represented by a numerical number assigned by the calibrator to these motors which initially correspond to the calibration rates. Should it be necessary to alter or change the calibration rates for either of these motors, the motor speed may be changed by entering a new number using the numerical keypad 276 and then depressing the return key 282 to save this change.

One reason that a calibration rate might need to be altered or changed, for example, would be if an elongated tube 208 or 209 from a container 200 or 201 becomes pinched or compressed such that it becomes more difficult for the glue substance 206 to travel through the elongated tube. If this occurs, the speed of the glue motor, under the initial calibration rates, would produce a slower flow rate of the glue substance 206 and therefore the amount of glue substance 206 would then not correspond with the flow rate of the insect control substance 46 produced by the flake motor as calibrated. This then enables the speed of the left glue motor to be re-calibrated such that the proper amount of insect control substance 46 is being mixed with the proper amount of glue substance 206 in the aerial dispersal unit 44.

Figure 18:
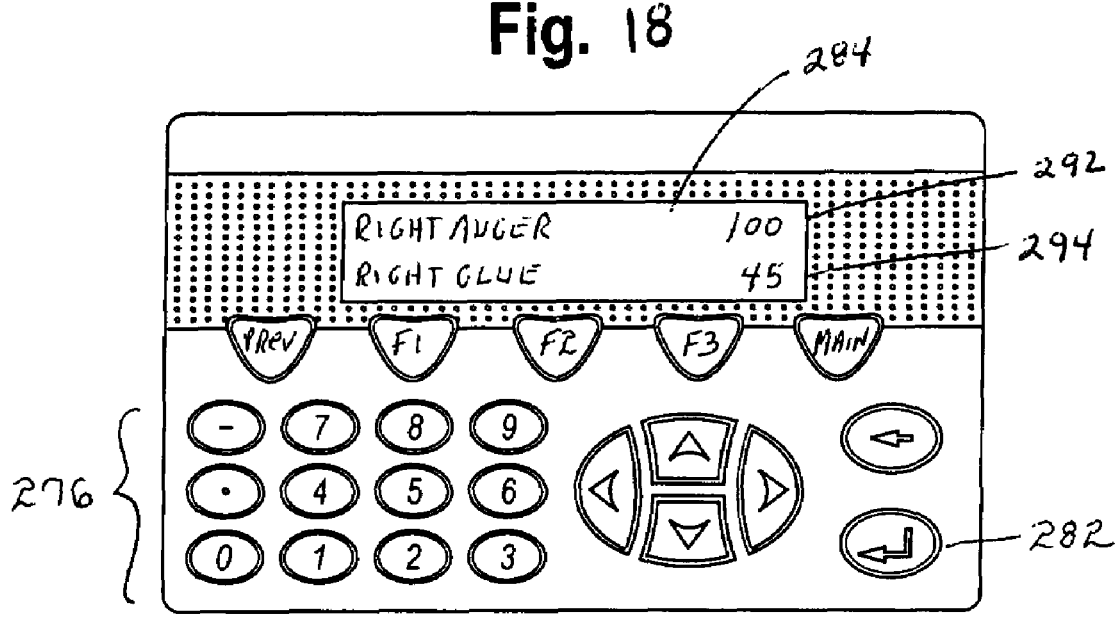
FIG. 18 is a front view of the dispersal unit operator interface and, in particular, illustrating the information displayed in the display at initialization relating to the right aerial dispersal unit.

Depressing the arrow 278 (down) again, the display 284 will provide the information as illustrated in FIG. 18. This information displays the term "Right Auger" adjacent to a right auger motor speed 292 and a "Right Glue" adjacent to a right glue motor speed 294. The term "Right Auger" refers to the right flake motor and the right auger motor speed 292 refers to the speed that has been calibrated in the calibration rates for the right flake motor. The term "Right Glue" refers to the right glue motor and the right glue motor speed 294 refers to the speed that has been calibrated in the calibration rates for the right glue motor. Again, these motor speeds indicated in the display 284 are represented by a numerical number assigned by the calibrator to the motor which correspond to the initial calibration rates. Should it be necessary to alter or change the calibration rates for either of these motors, the motor speed may be changed by entering a new number using the numerical keypad 276 and then depressing the return key 282 to save this change.

Figure 19:
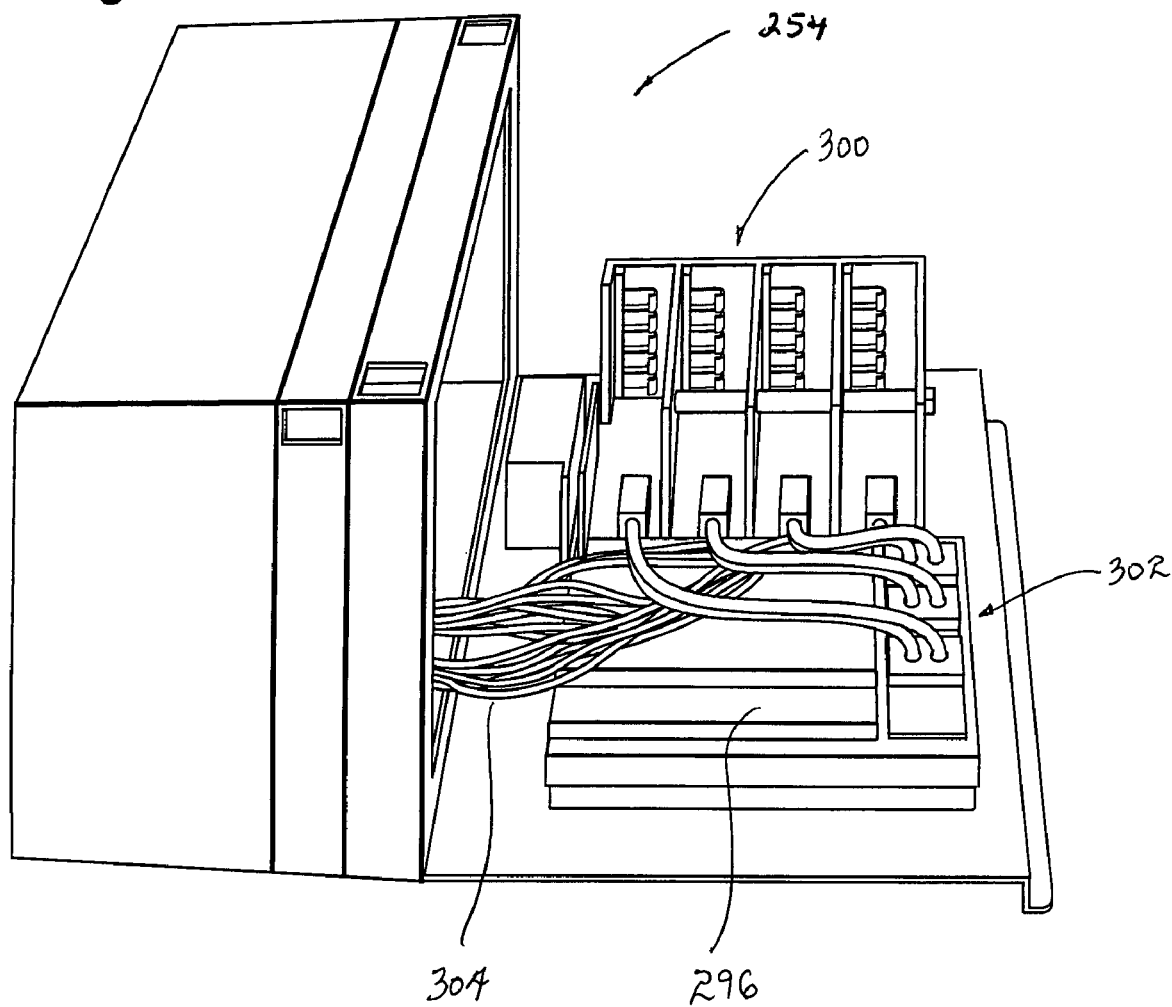
FIG. 19 is a perspective view of the components contained within the control box.

Referring to FIG. 19, the components of the control box 254 are more clearly illustrated. The control box 254 comprises a computer processing or controller unit 296. In the preferred embodiment, the computer processing or controller unit 296 is a MC 206, 4-axis controller made by Trio located in the United Kingdom. Alternatively, any other computer processing unit or controller may be used as is known to one skilled in the art provided that it accomplishes the purposes described herein.

In the preferred embodiment, the computer processing or controller unit 296 controls the left flake motor, the left glue motor, the right flake motor, and the right glue motor using driver or amplifier cards 300. In the preferred embodiment, the driver or amplifier cards 300 are a 6410 series stepper amplifier manufactured by Pacific Scientific. Alternatively, any other driver or amplifier card may be used as is known to one skilled in the art provided that it accomplishes the purposes described herein.

In the preferred embodiment, as there are four motors to control, there is one driver or amplifier cards 300 that corresponds to each motor. When the computer processing or controller unit 296 receives the global positioning satellite information data and determines whether the speeds of the motors need to be increased or decreased in relation to the actual ground speed of the aerial vehicle 40, the computer processing or controller unit 296 will send the motor speed information through a separate axis 302 that individually corresponds to each driver or amplifier card 300. Upon receipt of this information, each driver or amplifier card 300 sends the information to the corresponding motor through the respective conductor wires 304 to increase or decrease the speeds of the motors and, therefore, automatically alter or change the flow rates for disbursing the insect control substance 46.

During flight operations, the function 1 (F1) key 268 is depressed to arm the system and the function 2 (F2) key 270 is depressed to turn on the flow control. When this occurs, the display 284 of the dispersal unit operator interface 252 will indicate an "(F1) ON" and an "(F2) ON." The actual ground speed of the aerial vehicle 40 will be indicated by GSd, the base speed will indicated by BSd, and the variable dispensing rate 287 will be shown.

When the designated area 42 is approached, the mixer switch 258 (See FIG. 14) is depressed or toggled to the "on" position. This will energize the motor 242 (i.e., mixer motor) and begin rotation of the mixing auger 238 in both the left aerial dispersal unit 253 and right aerial dispersal unit 255. Since this motor is a single speed motor, the rotation of the mixing auger 238 will remain fixed and constant during operation. In the preferred embodiment, the mixing auger 238 should be energized prior to the flake motors and glue motors to prevent an undesired build up of the mixing of the insect control substance 46 and the glue substance 206 within the dispensing chamber 60.

Once the designated area 42 is reached, the flakes switch 260 (See FIG. 14) is depressed or toggled to the "on" position. This will energize the motor 70 (i.e., flake motor) and begin rotation of the flake auger 76 in both the left aerial dispersal unit 253 and right aerial dispersal unit 255. At the same time, the glue switch 262 (See FIG. 14) is also depressed or toggled to the "on" position. This will energize the motor 210 (i.e., glue motor) to begin using the pump 218 and transfer of the glue substance 206 in both the left aerial dispersal unit 253 and right aerial dispersal unit 255. With all the motors in the aerial dispersal units operating, the system will proceed to dispense the insect control substance 46 bonded with the glue substance 206 into the air for displacement over the designated area 42. This is referred to as a "first swath pass." If the designated area 42 is sufficiently large such that not all of the designated area 42 is covered during the first swath pass, a second and subsequent swath passes may be made until the entire designated area 42 is covered.

During the swath passes, if, using the example as provided in FIG. 16, the actual ground speed of the aerial vehicle 40 is at 135 miles per hour (mph), this directly corresponds with the initial calibrated base speed of 135 and, therefore, there is no change to the calibration rates for the flake motors and glue motors as these motors are operating at the variable dispensing rate number 287 of 100%.

If, however, during the swath passes, the actual ground speed of the aerial vehicle 40 becomes higher than 135 miles per hour (mph), then the aerial vehicle 40 will be traveling over the designated area 42 faster than the base speed of 135 and the corresponding calibration rates for the flake motors and glue motors. If this occurs, the system will automatically, using the computer processing or controller 296 and driver or amplifier cards 300, increase the speed rates of both the flake motors and glue motors by substantially the same percentage as the increase in the ground speed from the base speed to thereby maintain a constant uniform disbursement of the insect control substance 46 over the designated area 42. The computer processing or controller 296 will likewise update this same information to be reflected in the dispersal unit operator interface 252.

Figure 20:
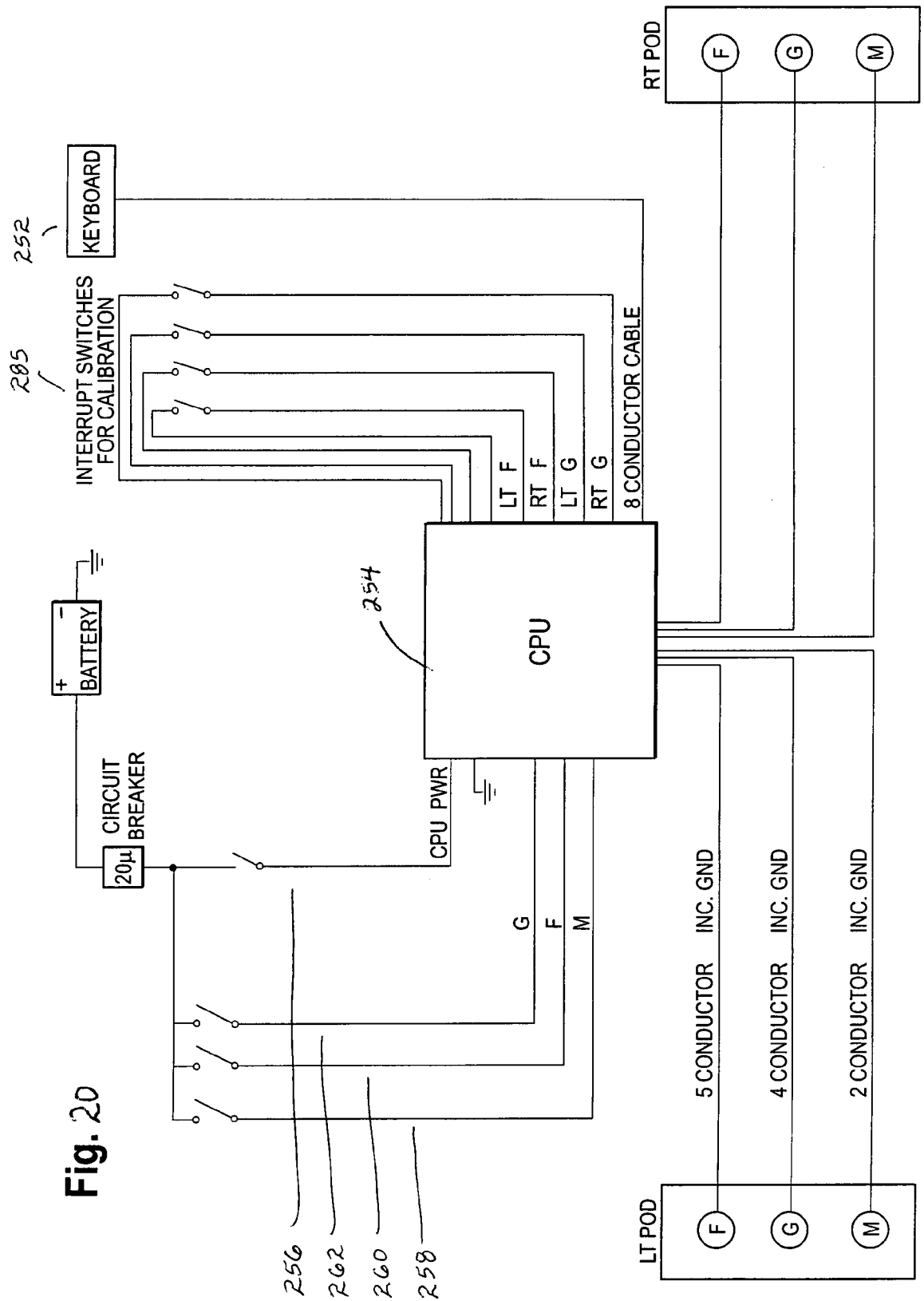
FIG. 20 is an electrical schematic diagram of the operation and control Applicant's invention.

The operation and control of this system is also further provided in the electrical schematic as illustrated in FIG. 20. The letters "F" refers to flake motor, "G" refers to glue motor, "M" refers to mixer motor, "GND" refers to ground wire, "LT" refers to the left aerial dispersal unit, and "RT" refers to the right aerial dispersal unit.

If, on the other hand, during the swath passes, the actual ground speed of the aerial vehicle 40 becomes lower than 135 miles per hour (mph), then the aerial vehicle 40 will be traveling over the designated area 42 slower than the base speed of 135 and the corresponding calibration rates for the flake motors and glue motors. If this occurs, the system will automatically decrease the speed rates of both the flake motors and glue motors by substantially the same percentage as the decrease in the ground speed from the base speed to thereby maintain a constant uniform disbursement of the insect control substance 46 over the designated area 42.

When the application of the insect control substance 46 over the designated area 42 is completed, the flakes switch 260, the glue switch 262, and the mixer switch 258 are depressed or toggled to the "off" position. The function 2 (F2) key 270 is then also depressed to turn off the flow control (i.e., (F2) OFF." The process may then be repeated over other designated areas 42 as desired.

Thus, there has been provided a unique aerial application dispersal system. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. An aerial application dispersal system, comprising:
   a housing containing an insect control substance and a glue substance;
   a dispensing chamber connected to the housing;
   means for moving the housing and dispensing chamber through the air;
   means for transferring the insect control substance into the dispensing chamber;
   means for transferring the glue substance into the dispensing chamber;
   means for regulating the rate at which the means for transferring the insect control substance into the dispensing chamber is transferred and increasing or decreasing the rate by the same percentage to correspond to any increase or decrease in the changes in the actual speed of the aerial vehicle;
   means for regulating the rate at which the means for transferring the glue substance into the dispensing chamber is transferred and increasing or decreasing the rate by the same percentage to correspond to any increase or decrease in the changes in the actual speed of the aerial vehicle;
   means for mixing the insect control substance with the glue substance in the dispensing chamber to form a mixture; and
   means for moving the mixture out the dispensing chamber for disbursement of the mixture into the air and over a designated area.

2. The device of claim 1 wherein the insect control substance is a synthetic insect pheromone flake.

3. The device of claim 1 wherein the means for moving the housing and the dispensing chamber through the air is an aerial vehicle.

4. The device of claim 1 wherein the means for transferring the insect control substance into the dispensing chamber comprises a plurality of feeder ports in the housing, a flake auger contained within a hollow housing situated adjacent to the plurality of feeder ports, and a flake motor, wherein the insect control substance is fed through the plurality of feeder ports and into the hollow housing, the flake auger is rotated by the flake motor for transferring the insect control substance through the hollow housing and into the dispensing chamber.

5. The device of claim 4 wherein the flake motor is a variable speed, stepper motor.

6. The device of claim 1 wherein the means for transferring the glue substance into the dispensing chamber comprises a flexible tube in fluid communication with the glue substance, a pump, and a glue motor, wherein the glue substance is transferred through the flexible tube and into the dispensing chamber by the pump powered by the glue motor.

7. The device of claim 6 wherein the pump is a peristaltic pump.

8. The device of claim 6 wherein the glue motor is a variable speed, stepper motor.

9. The device of claim 1 wherein the means for regulating the rate at which the means for transferring the insect control substance into the dispensing chamber is transferred comprises a computer processor.

10. The device of claim 9 wherein the means for regulating the rate at which the means for transferring the glue substance into the dispensing chamber is transferred comprises a computer processor.

11. The device of claim 1 wherein the means for mixing the insect control substance with the glue substance to form the mixture comprises at least one inlet port on the dispensing chamber, wherein the glue substance is injected into the dispensing chamber through the at least one inlet port for engaging the insect control substance within the dispensing chamber.

12. The device of claim 1 wherein the means for moving the mixture out the dispensing chamber for disbursement of the mixture into the air and over a designated area comprises a mixing auger, a motor, and an exit portal contained in the dispensing chamber, wherein the insect control substance is moved through the dispensing chamber and out the exit portal by the mixing auger rotated by the motor.

13. An aerial application dispersal system, comprising:
- an aerial vehicle;
- a housing detachably secured to the aerial vehicle, the housing containing an insect control substance and a glue substance, the insect control substance contained separate and apart from the glue substance;
- a dispensing chamber;
- means for moving the insect control substance from the housing and into the dispensing chamber at an insect calibrated rate, the insect calibrated rate based on a predetermined ground speed of the aerial vehicle over a designated area;
- means for moving the glue substance from the housing and into the dispensing chamber at a glue calibrated rate, the glue calibrated rate based on the predetermined ground speed of the aerial vehicle over the designated area;
- means for continually determining whether the actual ground speed of the aerial vehicle while in flight over the designated area has increased or decreased in relation to the predetermined speed of the aerial vehicle;
- means for changing the insect calibrated rate while the aerial vehicle is in flight to increase or decrease the insect calibrated rate by the same percentage in increase or decrease of the actual ground speed of the aerial vehicle in relation to the predetermined ground speed of the aerial vehicle;
- means for changing the glue calibrated rate while the aerial vehicle is in flight to increase or decrease the glue calibrated rate by the same percentage in increase or decrease of the actual ground speed of the aerial vehicle in relation to the predetermined ground speed of the aerial vehicle;
- means for mixing the insect control substance and the glue substance to form a mixture; and
- means for dispensing the mixture from the dispensing chamber and into the air over the designated area with the amount of the mixture changing corresponding to the actual ground speed of the aerial vehicle thereby permitting a substantially consistent dispensing of mixture over the designated area.

14. The device of claim 13 wherein the means for changing the insect calibrated rate while the aerial vehicle is in flight comprises a computer processor.

15. The device of claim 14 wherein the computer processor sends a signal to the means for moving the insect control substance from the housing and into the dispensing chamber changing the insect calibrated rate.

16. The device of claim 14 wherein means for changing the glue calibrated rate while the aerial vehicle is in flight is the same as the means for changing the insect calibrated rate while the aerial vehicle is in flight.

17. The device of claim 13 wherein the means for changing the insect calibrated rate and the glue calibrated rate while the aerial vehicle is in flight comprises manual interaction with an interface unit.

18. A method for dispensing the combination of an insect control substance and a glue substance over a designated area from an aerial vehicle, comprising the steps of:
- storing the insect control substance and the glue substance separate and apart from one another;
- moving the insect control substance at a predetermined insect rate to a mixing location, the predetermined insect rate based on a predetermined ground speed of the aerial vehicle over the designated area;
- moving the glue substance at a predetermined glue rate to the mixing location, the predetermined glue rate based on the predetermined ground speed of the aerial vehicle over the designated area;
- mixing the insect control substance with the glue substance at the mixing location to form a mixture;
- dispensing the mixture at a dispensing rate over the designated area from a starting point;
- continually determining whether the actual ground speed of the aerial vehicle while in flight over the designated area has increased or decreased in relation to the predetermined ground speed of the aerial vehicle;
- continually changing the predetermined insect rate to a changing insect rate based on the actual ground speed of the aerial vehicle, the changing insect rate defining the increase or decrease in the predetermined insect rate by the same percentage in increase or decrease of the actual ground speed of the aerial vehicle in relation to the predetermined ground speed of the aerial vehicle;
- continually changing the predetermined glue rate to a changing glue rate based on the actual ground speed of the aerial vehicle, the changing glue rate defining the increase or decrease in the predetermined glue rate by the same percentage in increase or decrease of the actual ground speed of the aerial vehicle in relation to the predetermined ground speed of the aerial vehicle;
- moving the insect control substance at the changing insect rate to the mixing location;
- moving the glue substance at the changing glue rate to the mixing location;
- continually dispensing the mixture at the dispensing rate over the designated area until an ending point is reached, the mixture continually changing to correspond to the actual ground speed of the aerial vehicle permitting an equal dispensing of mixture over the designated area; and
- stopping the dispensing of the mixture.

19. The method of claim 18 and further comprising the step of calibrating the predetermined insect rate to the predetermined ground speed of the aerial vehicle.

20. The method of claim 18 and further comprising the step of calibrating the predetermined glue rate to the predetermined ground speed of the aerial vehicle.

* * * * *